United States Patent

[11] 3,563,340

| [72] | Inventor | Louis Duthion<br>Paris, France |
|---|---|---|
| [21] | Appl. No. | 802,397 |
| [22] | Filed | Feb. 26, 1969 |
| [45] | Patented | Feb. 16, 1971 |
| [73] | Assignee | Bertin & Cie,<br>Plaisir, Yvelines, France |
| [32] | Priority | Feb. 29, 1968 |
| [33] | | France |
| [31] | | 141,781 |

[54] RETRACTABLE SILENCING FLAPS FOR JET ENGINE INTAKE
19 Claims, 15 Drawing Figs.

[52] U.S. Cl. ..................................................... 181/64,
181/66, 181/56
[51] Int. Cl. ................................................... B64d 33/02,
B64d 33/06; F01n 1/12
[50] Field of Search............................................ 181/64,
64.1, 66, 33, 33.21, 33.22, 33.221, 33.222, 35,
35.1, 56; 137/15.1, 15.2; 239/265.11, 265.13,
265.33, 265.39

[56] References Cited
UNITED STATES PATENTS

| 1,353,478 | 9/1920 | Jeffries.......................... | 181/66 |
| 1,673,414 | 6/1928 | Maxim........................... | 181/66X |
| 1,713,047 | 5/1929 | Maxim........................... | 181/64(.1) |
| 2,778,190 | 1/1957 | Bush............................... | 239/265.39X |
| 3,238,955 | 3/1966 | Lassiter......................... | 181/33(.21) |

FOREIGN PATENTS

| 921,127 | 3/1963 | Great Britain................. | 181/33(.21) |
| 935,119 | 8/1963 | Great Britain................. | 181/33(.21) |

*Primary Examiner*—Robert S. Ward, Jr.
*Attorney*—Watson, Cole, Grindle & Watson

ABSTRACT: The invention relates to a silencing system for pipes which carry fluids, more particularly fluid inlet pipes for turbojet engines, and is characterized in that the silencing system comprises longitudinal soundproofed flaps so arranged that they can either be extended in order to divide the pipe into soundproofed unit ducts or retracted into a reduced volume.

Patented Feb. 16, 1971

Inventor
Louis Duthion by:
Watson Cole, Grindle + Watson
Attorneys

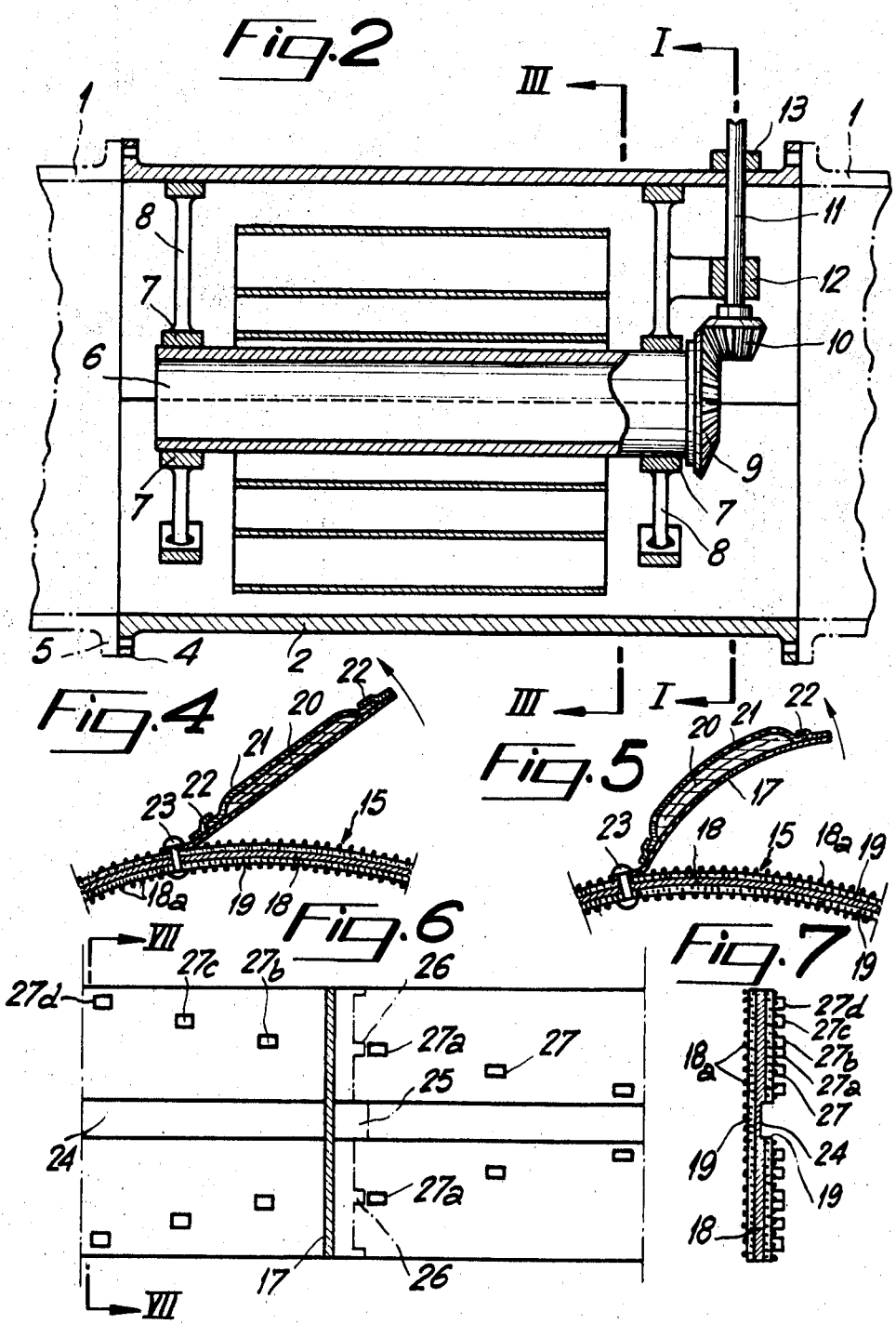

Patented Feb. 16, 1971  3,563,340

Inventor
Lovro Duchnow
By
Wilson, Cole, Grindle Nickelson
Attorneys

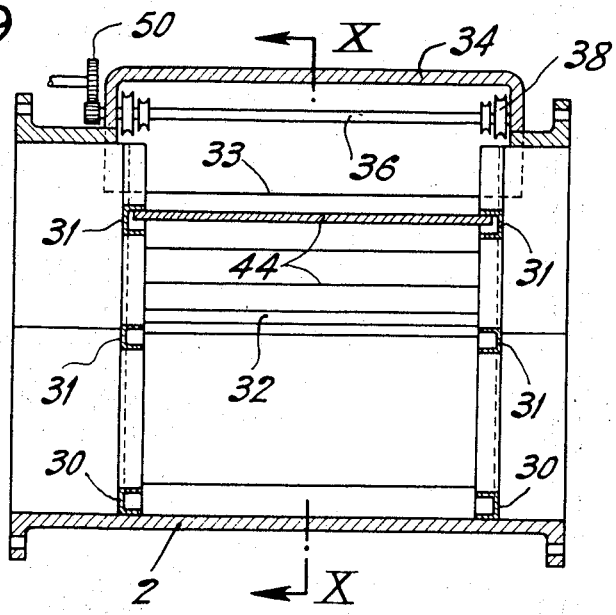
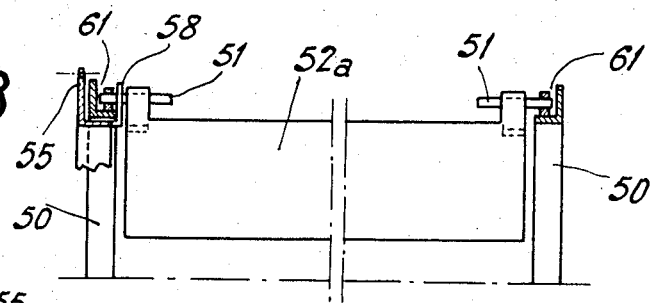
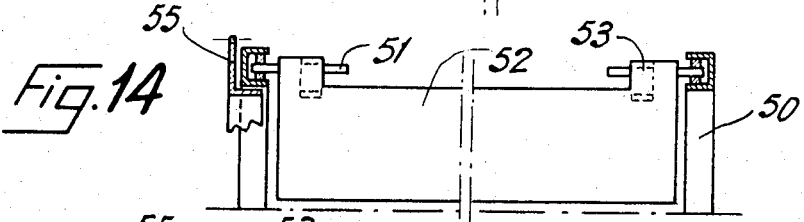
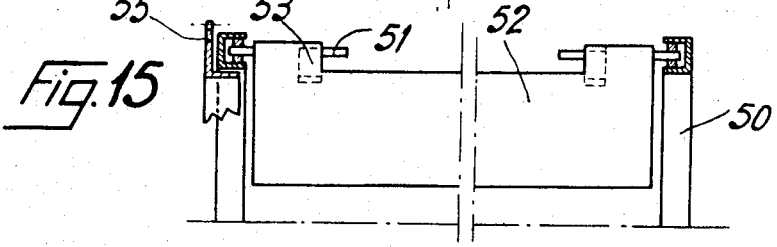

Patented Feb. 16, 1971
3,563,340
5 Sheets-Sheet 5
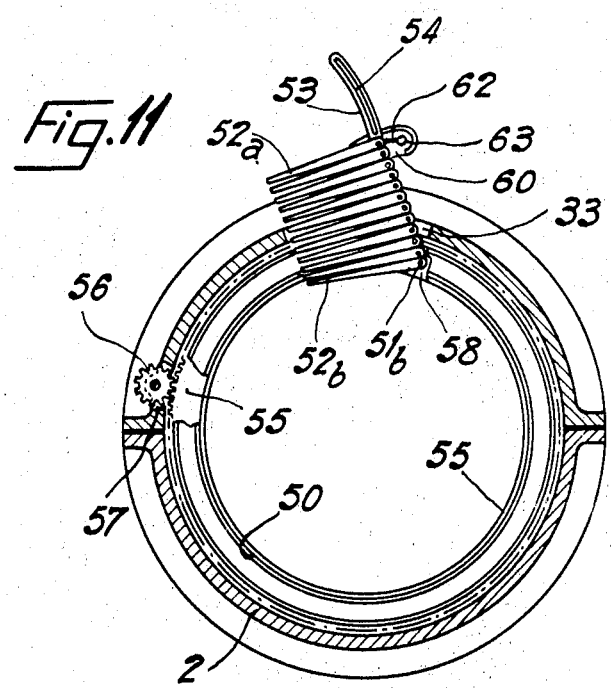
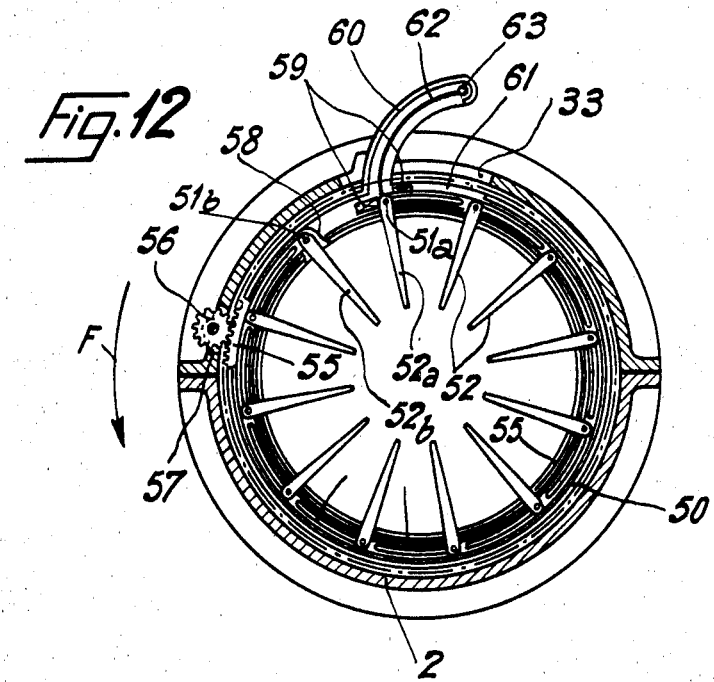

RETRACTABLE SILENCING FLAPS FOR JET ENGINE INTAKE

This invention relates to a silencing system for pipes carrying fluids, more particularly fluid inlet pipes for turbojet engines, and which comprises essentially longitudinal soundproofed flaps so arranged that they can either be extended in order to divide the pipe into soundproofed unit duct or be retracted to a very reduced volume. In the specific case of application to turbojet engine pipes it is thus possible to extend the system on takeoff and landing and retract it for normal cruising flight when the noise is less annoying.

The resulting soundproofed unit ducts in the pipe form Helmholtz resonators which produce resonant vibrations perpendicular to the direction of propagation of the sound waves which are to be attenuated, and these sound waves are weakened as a result.

The following description with reference to the accompanying drawing given by way of nonlimitative example will clearly show how the invention may be performed.

FIG. 2 is a longitudinal section corresponding to FIG. 1 but with the silencing system extended.

FIGS. 4 and 5 are sections to an enlarged scale showing two exemplified embodiments of resilient flaps.

FIG. 6 is a partial developed view of the band which cooperates with the flaps, the latter not being secured to the band.

FIG. 7 is a section on VII-VII in FIG. 6.

FIG. 9 is a longitudinal section of this system on the line IX-IX in FIG. 10.

FIGS. 11 and 12 are cross sections of a third embodiment, the flaps being respectively retracted (FIG. 11) and extended (FIG. 12).

FIGS. 13 to 15 are diagrammatic views showing the arrangement of consecutive flaps.

Figure 1:
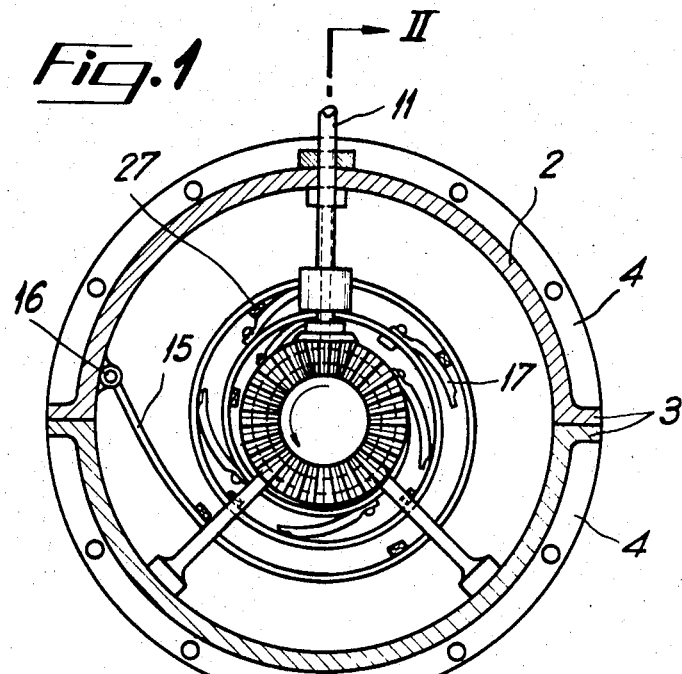
FIG. 1 is a section on the line I-I in FIG. 2 of a first embodiment of the invention, the silencing system being practically completely retracted.
Figure 3:
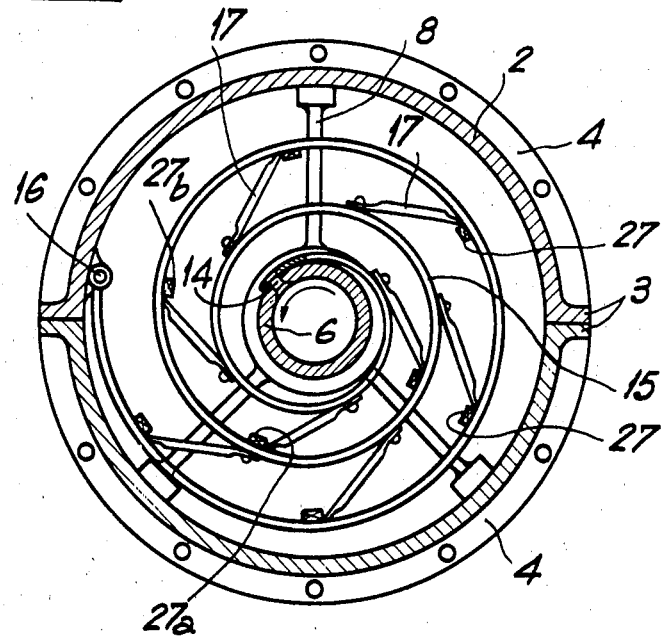
FIG. 3 is a section on the line III-III in FIG. 2, the latter in turn being a section on the line II-II in FIG. 3.

In the embodiment shown in FIGS. 1—3, the pipe 1 incorporates a silencing system comprising a tubular member 2 of the same inside diameter as the pipe.

The tubular member 2 is formed by two semicylindrical halves interconnected longitudinally by flanges 3 (FIGS. 1 and 3) and connected to the sections of the pipe 1 by flanges 4, for which purpose the pipe sections are provided with flanges 5 as shown in FIG. 2.

A tube 6 mounted in bearings 7 borne by radial arms 8 secured to the semicylindrical halves extends along the axis of the tubular member 2.

At one end, the tube 6 has a bevel gear 9 meshing with a bevel gear 10 fixed to a small radial shaft 11 mounted in bearings 12 and 13 and adapted to be driven from outside the tubular member 2. The bearing 12 is borne by one of the arms 8 near the shaft 11.

A flexible soundproofed band 15 is secured by one edge, e.g. by rivets 14 (FIG. 3) along the generatrix of the tube 6 between the bearings 7 and is wound around the tube a plurality of times before being pivotally connected at 16 along its other edge to a hinge provided on the tubular member 2.

Flaps 17 of the same width as the band 15 and which are also soundproofed are provided on the band at increasing intervals from the edge secured to the tube 6 to the edge pivotally connected to the tubular member 2.

As shown in FIGS. 4 and 5, the flexible band 15 may be formed by a thin resilient strip 18, e.g. of metal, one or both surfaces of which are lined (19) with a soundabsorbent material, e.g. a glass wool based covering covered by a metal fabric or screen 18a. The strip 18 is wound on the tube 6 in such manner that it tends to unwind itself by its own elasticity.

The flaps 17, which may be flat (FIG. 4) or curved in the same direction as the band 15 so as to provide better retraction, as shown in FIG. 5, comprise a thin perforate resilient plate, e.g. also of metal, which may be covered on both surfaces like the band but preferably has a soundabsorbent lining 20 on its outer surface, this lining being held in position by a cover 21 of perforate sheet metal or wire gauze retained in rims 22.

The flaps 17 are secured to the band 15 in the direction of the generatrices of the latter by rivets 23 by one of their edges which is raised so that the flap resiliently tends to form an appreciable angle, e.g. of the order of 60—70° maximum, with the band.

When the band equipped with its flaps is mounted in the system, each flap bears by its free edge on the inner surface of the turn of the band which overlaps it.

As will be apparent from FIGS. 6 and 7, the inner surface of the band 15 has a guide groove 24 perpendicular to the flaps 17 and engaging a stud 25 provided on each flap.

Each flap is also provided with two stop lugs (FIG. 6) the specific spacing of which is different on each flap.

The inner surface of the band 15 has suitably disposed pairs of stops 27, 27a, 27b and so on, at different intervals.

The arrangement is such that each pair of stops stops a specific flap but passes freely beneath the others. Thus the flap shown in FIG. 6 is stopped by the stops 27a which are spaced by an amount corresponding to the spacing of the stop lugs 26. On the other hand, it can clear the stops 27, 27b and so on.

The above-described silencing system operates as follows:

When the shaft 11 is rotated in the required direction the tube 6 rotates in the direction of the arrow so that the turns formed by the band 15 close up and force the flaps 17 to be applied to the band. This movement takes place against the resilience of the flaps and the band.

If the resilient force is sufficient, it is only necessary to disengage the shaft 11 for the system to extend automatically. Otherwise, the shaft is turned in the opposite direction to that referred to above.

When the system is extended each flap bears on the stops associated with it, as shown in FIG. 3; the band and the flaps form multiple soundproofed ducts which greatly reduce any noise as already explained.

Figure 8:
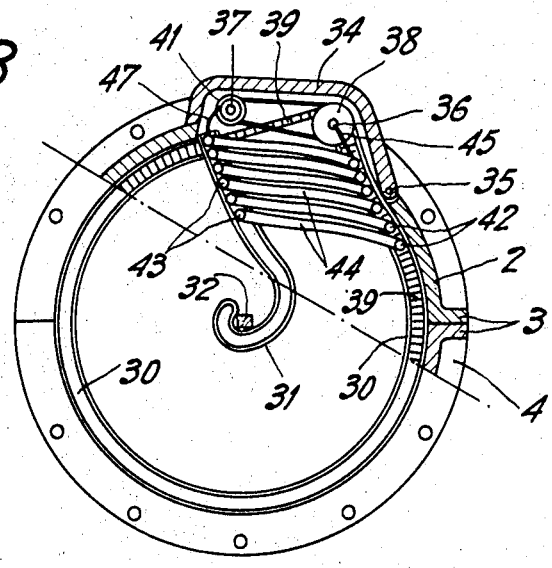
FIG. 8 is a partial cross section of another embodiment of the invention showing the silencing system retracted.
Figure 10:
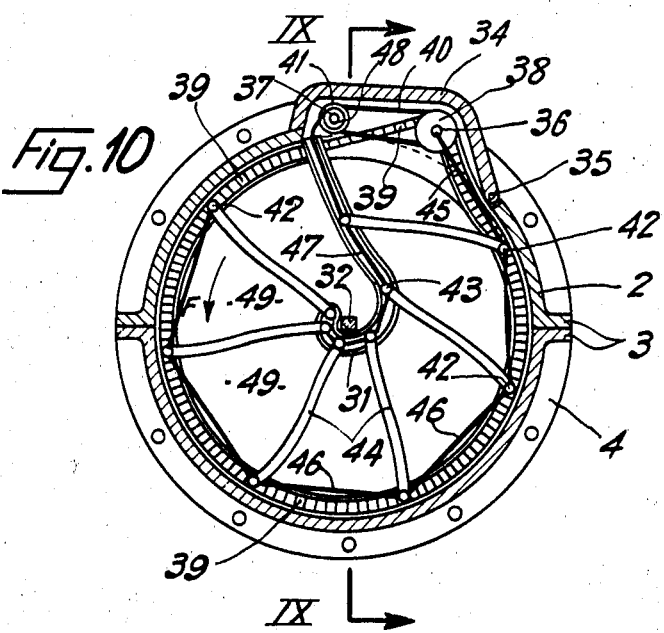
FIG. 10 is a section on the line X-X in FIG. 9, the silencing system being extended.

In the variant shown in FIGS. 8 to 10, the tubular member 2 contains two peripheral U-shaped guides 30 extending towards one another over practically the entire inside circumference.

Radial guides 31 of substantially J-shape are secured to one of the ends of the guides 30 as shown in FIGS. 8 and 10. The guides 31 also have a U-section and extend towards one another.

The guides 31 are interconnected near the center of the tubular member 2 by a solid strut 32 (FIG. 10).

The ends of the guides 30 and 31 stop near an aperture 33 formed in the tubular member 2 and closed by a cap 34 pivotally connected by a hinge 35.

Shafts 36 and 37 are mounted in the cap 34 parallel to the axis of the tubular member 2. Facing each guide 30, the shaft 36 bears a roller 38 having a double groove intended firstly for a cable 39 passing through the guide 30 and secondly for a cable 40 which rotates a pulley 41 mounted on the spindle 37 near the end of the guide 31.

The guides 30 and 31 also accommodate spindles 42 and 43 respectively provided at the outer and inner edges of the flaps 44 which, for example, are soundproofed in the same way as the flaps 17 in the previously described embodiment. The flaps 44 extend between the two pairs of guides as shown in the drawing.

The first of the spindles 42 is connected by a flexible connecting member 45 to the spindle 36 while similar connecting members 46 connect the other spindles 42 gradually.

The spindles 42 of the flap farthest away from the rollers 38 are attached to endless cables 39 which pass over the said rollers and through the guides 30 while the corresponding spindles 43 are secured to cables 47 accommodated in the guides 31 and wound on a reel 48 driven by the pulley 41.

The length of the connecting members 45 and 46 is so designed that when the flaps 44 are extended they form ducts 49, which are substantially equal to one another, in the tubular member 2.

When the cable 39 is turned in the direction of the arrow F (FIG. 10), the various flaps are stacked on one another as shown in FIG. 8. The shaft 36 is driven by a reduction gear 50 (FIG. 9) outside the tubular member 2.

To extend the flaps the cable 39 is turned in the opposite direction.

According to the embodiment shown in FIGS. 11 to 15, the tubular member 2 which again has an aperture 33 contains circular U-section guides 50 disposed opposite one another in register with the aperture.

Lateral lugs 51 secured to soundproofed radial flaps 52 extending, for example, over substantially two-thirds of the radius of the pipe can slide in the said guides.

Except for the first flap 52a, the lugs 51 on each flap are each secured for rotation to a suitably curved link 53 formed with an elongate slot 54 in which the lug 51 of the preceding flap can slide. The slot extends over practically the entire link so that if the last flap 52b is brought towards the first flap by moving it along the guides in the direction of the arrow F in FIG. 12, the flaps 52 can be combined into a stack against the flap 52a which remains fixed.

The flaps are actuated by means of a toothed ring 55 concentric with one of the guides 50 against which it is mounted and which can be driven by a driving gear 56 partially introduced into the tubular member 2 via an aperture 57. The ring 55 has a lug 58 engaging the corresponding lug 51b of the flap 52b (FIG. 12).

The lugs 51a of the first flap 52a are held by stops 59 (FIG. 12) facing curved guides 60 connected to the guides 50 and the axis of which coincides with the position assumed by the axis of the lugs 51b of the end flap 52b when the flaps are combined into the stack shown in FIG. 11.

Before the guides 60 and hence in register with the opening 33 in the tubular member 2, the guides 50 have external lateral recesses 61 (FIGS. 12 and 13) which, by means of cables 62 passing through the guides 60 and secured to the lugs 51a, enable the flap system to be raised in order to retract it via the aperture 32 out of the tubular member 2. To this end, each cable 62 is wound on a reel 63 borne by the corresponding guide 60.

As shown in FIGS. 13 to 15, the guides 53 are suitably distributed over the length of the corresponding flaps so as to allow the latter to be stacked on one another and occupy the minimum of space.

Modifications can, of course, be made to the above-described embodiments, more particularly by the substitution of equivalent technical means without thereby departing from the scope of this invention.

I claim:

1. A silencing system for pipes which carry fluids, more particularly fluid inlet pipes for turbojet engines, comprising longitudinal soundproofed flaps so arranged that they can either be extended in order to divide the pipe into soundproofed unit ducts or retracted into a reduced volume.

2. A silencing system according to claim 1, wherein the longitudinal flaps are pivotally connected to a soundproofed band, one of the edges of which is attached to the pipe while the other is attached to a central member coaxial with the pipe and which can be rotated on itself.

3. A system according to claim 2, wherein return means are associated with the flap and tend to move them away from the band.

4. A system according to claim 3, wherein each flap comprises a resilient strip secured to the band by a suitably folded edge.

5. A system according to claim 2, wherein said flaps comprise a resilient strip covered on at least one of its faces with a sound absorbing material.

6. A system according to claim 2, wherein said flaps comprise a resilient strip pierced with holes and provided on one of its faces with a covering of sound absorbing material secured in place by a perforated cover.

7. A system according to claim 2, wherein said flaps are plane.

8. A system according to claim 2, wherein said flaps are arcuate in the same direction as said band.

9. A system according to claim 2, wherein the band is arranged so that it tends to unwind itself.

10. A system according to claim 9, wherein the band has at least one resilient strip lined on at least one of its faces with soundabsorbent material.

11. A system according to claim 2, wherein each flap bears on the inner surface of the band, guide means being provided between the band and the flaps perpendicularly to the pipe axis.

12. A system according to claim 2, wherein each flap bears on the inner surface of the band, corresponding stops being provided on the said inner surface and on each of the flaps so as to stop each flap in a specific position with respect to the band.

13. A system according to claim 1, wherein it comprises lateral guides in which the flaps are mounted, a control mechanism being provided for moving the flaps apart or bringing them together so that they bear against one another.

14. A system according to claim 13, wherein the lateral guides comprise a pair of peripheral guides secured to the inner wall of the pipe and a pair of central guides, the flaps being guided in the said guides by lateral lugs and cable control means being provided to move the flap lugs in the guides.

15. A system according to claim 13, wherein the lateral guides are peripheral and the flaps, which are disposed radially with respect to the pipe, are connected together by links engaging in the guides.

16. A system according to claim 15 comprising a ring associated to one of said guides, secured to one of said flaps so that said flaps may be moved apart and together.

17. A system according to claim 13, wherein the pipe has a lateral aperture through which at least some of the flaps can be retracted from the pipe after having been brought together.

18. A system according to claim 17, wherein the lateral aperture is provided with a hinged cap.

19. A system according to claim 1, comprising a tubular member of the same inside diameter as the pipe requiring to be silenced, said tubular member being so arranged that it can be incorporated in the said pipe.